US012345389B2

(12) United States Patent
Niederer et al.

(10) Patent No.: US 12,345,389 B2
(45) Date of Patent: Jul. 1, 2025

(54) OPTICAL DEVICE USABLE AS A MOTOR VEHICLE HEADLIGHT

(71) Applicant: Eberspächer catem GmbH & Co. KG, Herxheim (DE)

(72) Inventors: Michael Niederer, Kapellen-Drusweiler (DE); Peter Scholz, Karlsruhe (DE); Kurt Walz, Hagenbach (DE); Ralf Lothar Weinand, Wörth am Rhein (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 0 days.

(21) Appl. No.: 18/381,917

(22) Filed: Oct. 19, 2023

(65) Prior Publication Data

US 2024/0133535 A1 Apr. 25, 2024
US 2024/0230056 A9 Jul. 11, 2024

(30) Foreign Application Priority Data

Oct. 21, 2022 (DE) ..................... 10 2022 127 869.7

(51) Int. Cl.
*F21S 45/60* (2018.01)
*F21S 41/148* (2018.01)
*F21S 41/32* (2018.01)

(52) U.S. Cl.
CPC ............. *F21S 45/60* (2018.01); *F21S 41/148* (2018.01); *F21S 41/32* (2018.01)

(58) Field of Classification Search
CPC .......... F21S 45/60; F21S 41/148; F21S 41/32; F21S 41/141; F21S 45/33; F21S 43/14; F21S 45/37; F21S 45/20; F21S 45/10; F21S 45/30; F21V 29/90; H05B 2203/02; H05B 3/0042; H05B 3/06; H05B 3/84; H05B 1/0213; B60Q 1/04; F21Y 2115/10; F21L 4/027; B60R 1/1207; B60R 1/02; B60R 1/0602; B60R 2011/0033; F21W 2102/00
See application file for complete search history.

(56) References Cited

U.S. PATENT DOCUMENTS

| | | | | |
|---|---|---|---|---|
| 7,262,388 | B2 | 8/2007 | Moreth et al. | |
| 2006/0245202 | A1* | 11/2006 | Moreth | H05B 1/0213 362/547 |
| 2015/0055363 | A1* | 2/2015 | Van Straten | B60Q 1/0017 362/520 |
| 2016/0363286 | A1* | 12/2016 | Deering | H05B 3/84 |
| 2017/0240093 | A1* | 8/2017 | O'Sullivan | F21S 45/60 |
| 2018/0073701 | A1 | 3/2018 | Shin et al. | |
| 2019/0017676 | A1* | 1/2019 | Van Straten | F21S 41/141 |

FOREIGN PATENT DOCUMENTS

| | | |
|---|---|---|
| JP | 2013152852 | 8/2013 |

* cited by examiner

*Primary Examiner* — Omar Rojas Cadima
(74) *Attorney, Agent, or Firm* — Boyle Fredrickson, S.C.

(57) ABSTRACT

An optical device usable as a headlight of a motor vehicle has an optical system in the form of a lens and/or a light source which is surrounded by a housing and which is covered by a translucent, in particular transparent, cover which is connected to the housing. To increase the functionality of the optical device, a PTC heating assembly is configured to heat a space between the housing and the cover. The PTC heating assembly includes at least one PTC element and strip conductors that are connected electrically to the PTC element.

13 Claims, 3 Drawing Sheets

OPTICAL DEVICE USABLE AS A MOTOR VEHICLE HEADLIGHT

BACKGROUND OF THE INVENTION

1. Field of the Invention

The present invention is in the field of optical devices, particularly those in a motor vehicle. Motor vehicles have optical devices in the form of headlights or cameras. These previously known devices have an optical system in the form of a lens or light source. Occasionally, a lens and a light source may also be provided in combination. A lens in the sense of the invention is to be understood as any element which covers a camera system or a light source on the front side. The lens may have special optical properties. It may also serve merely to cover and thus protect the internal components of, for example, the camera. Such a system is surrounded by a housing and covered with a light-transmitting, in particular transparent cover, which is connected to the housing. The cover can be an original component of the optical device. However, it can also be an additional component which is connected to the housing with the aim of protecting the actual optical system from the environment.

SUMMARY

The present invention aims to provide an improved optical device of the type described introductorily.

As a solution, the present invention proposes to provide the optical device including an optical system including a lens and/or a light source, a housing that surrounds the optical system, and a transparent cover which covers the optical system and which is connected to the housing. A PTC heating assembly is configured to heat a space between the housing and the cover. The PTC heating assembly includes at least one PTC element and strip conductors that are connected to the PTC element in an electrically conductive manner.

The PTC element can be a semiconducting plastic or a semiconducting ceramic Due to the self-regulating properties of the PTC element, overheating of the PTC heating assembly and thus thermal damage to the optical device is ruled out.

The strip conductors are usually supported against one another on the housing in an insulating manner They energize the PTC element with different polarity.

In a motor vehicle, this polarity can have two poles, namely ground with respect to the potential of a normal car battery. Likewise, the PTC element and the strip conductors that are electrically connected to it can be energized with high voltage, which can be the case in particular with electrically driven vehicles. In this case, the strip conductors are electrically insulated from the environment in a special way.

The PTC heating assembly serves to heat the space between the housing and the cover. As a result of this heating, the cover is also heated. This cover otherwise could be iced up in winter months or at cold outside temperatures and thus only inadequately meet the optical requirements placed on it. The PTC heating assembly allows the cover to be defrosted while avoiding external mechanical effects. Usually, if at all, icing of the cover, in particular from headlights, is removed with ice scrapers. The cover is usually made of plastic and is therefore relatively sensitive to scratches. The need for such scraping is reduced or eliminated with implementation of the present invention.

The PTC heating assembly can be heat-conducting by itself or can be connected to the space for convective transfer of the generated heat. In the case of a purely heat-conducting connection between the PTC heating assembly and the space, the PTC heating assembly can be provided on a side facing away from the cover and connected directly thereto in a heat-conducting manner. The heating of the housing also leads to heating of the space and thus to heating of the cover. Alternatively, the PTC heating assembly can discharge warm air, especially into the space and against the inside of the cover.

System-related, PTC heating assemblies are only heated to temperatures usually below 200° C. Heating beyond this is usually not possible due to the self-regulating properties of the PTC element. Thus, the solution according to the invention allows defrosting of the optical device while avoiding a red glowing heating wire, which would lead to an optical impairment of the device in case of a classical resistance heating. The use of a PTC heating assembly also allows systemic protection against overheating of the plastics surrounding the optical device or forming it entirely or partially. This type is commonly used for the configuration of functional optical components of a motor vehicle.

However, the device according to the invention can be used not only in a motor vehicle. In principle, it is possible to use the solution according to the invention also to protect street lamps from icing or to remove the same in order to reduce optical impairment of the cover. The device according to the invention can be or form therein any type of headlight or camera to defrost such optical devices or to prevent precipitation of moisture on a corresponding device.

It is understood that the PTC heating assembly is usually positioned relative to the optical system so that the PTC heating assembly does not impair the optical properties of the optical device. As mentioned above, the PTC heating assembly is typically located on a side facing away from the cover and is connected to the housing there. The connection can be made directly to the housing or indirectly to the housing. An indirect connection can be made, for example, with the interposition of a heat-conducting adapter. Such an adapter can be connected to the housing and/or to the cover in a heat-conducting manner.

On the heating assembly side, the adapter has a heat coupling surface which is configured to be adapted for a flat abutment to the PTC heating assembly. The adapter furthermore has a heat decoupling surface which is configured to be adapted for the flat abutment against the housing or the cover. The heat decoupling surface usually has a larger extension than the heat coupling surface. The heat coupling surface is typically the one against which the PTC heating assembly is applied in a heat-conducting manner.

Accordingly, the heat-conducting adapter typically spreads the heat and transfers the heat transferred from the PTC heating assembly by conduction to a larger surface on the side of the housing and/or the cover.

An optical mirror of a headlight, for example, can be considered as a housing. This mirror can be heated in a heat-conducting manner using the adapter by means of the PTC heating assembly. The heat generated in this way also prevents fogging of the cover and enables it to be defrosted. Additionally or alternatively, for example, a heat-conducting heating of the cover itself can take place, especially where the cover is connected to the housing. An edge area of the cover sometimes does not participate in the optical function of the cover. Thus, these edge areas are particularly suitable for arranging the PTC heating assembly.

With regard to convective heating of the cover, according to a possible further development, a blower is proposed which is connected in terms of flow to the housing, in particular to the an interior space of the optical device with the interposition of the PTC heating assembly. The blower generates an air flow which is directed through the PTC heating assembly and is usually introduced until it reaches the space. It is possible in principle to blow the heated air against the outside of the cover. This also indirectly heats up the space between the housing and the cover. However, such a solution exposes the PTC heating assembly to environmental influences, in particular in a motor vehicle, due to the necessary ventilation slots for blowing out the heated air. Thus, the arrangement of the ventilation slot inside the optical device, i.e. between the housing and the cover, and thus a direct convective heating of the space is possible.

A possible further development for convective heating of the optical device has a heater housing that joins a PTC heating assembly and the blower into one structural unit. The heater housing has an air inlet opening leading to the blower, an air outlet opening leading to the housing, which may be sealed from the housing, and an air channel formed between the blower and the PTC heating assembly, which is usually sealed from the environment. Thus, all of the airflow generated by the blower is directed via the PTC heating assembly.

The heater housing can be provided with fastening means as, for example, on the mounting frame or the like. Via this mounting frame, the heater housing can be mechanically connected to the optical device, in particular to the housing of the optical device. With regard to a modular structure, it is also possible to connect the heater housing near a headlight of a motor vehicle at a suitable location to the vehicle or to an outer housing part of the headlight that does not directly delimit the space in such a way that the air outlet opening and an air passage surface of the heater housing surrounding it come to rest in a recess of the housing of the headlight. The air outlet opening usually completes the surface of the headlight housing where it does not have an optical function.

BRIEF DESCRIPTION OF THE DRAWINGS

Further details and advantages will be apparent from the following description of embodiments in conjunction with the drawing. Therein.

DETAILED DESCRIPTION

Figure 1:
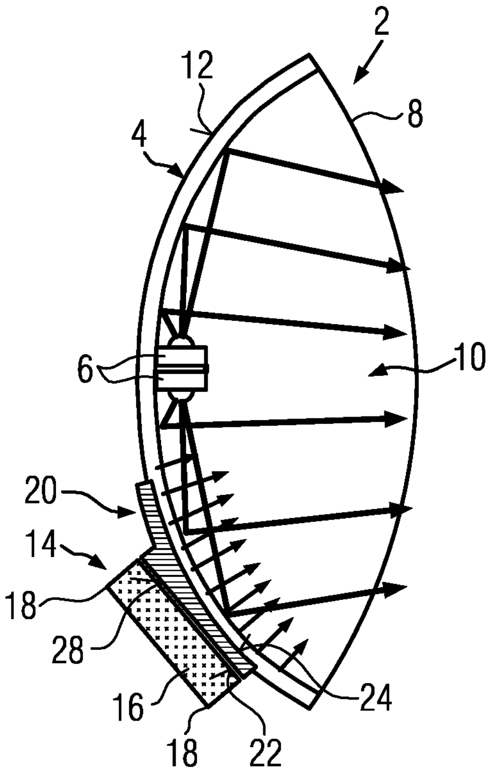
FIG. 1 shows a schematic view of a first embodiment of an optical device according to the invention, using the example of a headlight of a motor vehicle.

FIG. 1 shows a schematic sectional view of a first embodiment in the form of a headlight 2 of a motor vehicle with a housing 4, which is configured as a reflector for a light source 6, presently in the form of an LED chip, in order to deflect light emitted by the light source 6 in the outlined manner forwards and through a cover 8 made of a transparent plastic, so that the light passes through the cover 8, which is configured in the form of a disc. The light source 6 is located in a space 10 between the cover 8 and the housing 4.

A PTC heating assembly 14 is located on a rear side 12 of the housing 4 facing away from the cover 8. This comprises, in a generally known manner, a PTC element 16 and two strip conductors 18 assigned to different polarities. Reference sign 20 characterizes an adapter which has a heat coupling surface 22 abutting flatly against the PCT heating assembly 14 and a heat decoupling surface 24 provided opposite thereto. This heat decoupling surface 24 is larger than the heat coupling surface 22, so that a two-dimensional spread beyond the base surface of the PTC heating assembly 14 results. The flat abutment of the heat decoupling surface 24 against the rear side 12 of the housing 4 results in heating there that passes through the material of the housing 4 by heat conduction and, as illustrated by the shorter arrows in FIG. 1, also heats the space 10. Ultimately, the cover 8 is heated and thus icing or fogging on the outside of the cover 8 is removed.

The adapter 20 and the PTC heating assembly 14 may be pre-assembled to form a structural unit. The adapter 20 is made of a material with good heat-conducting properties, such as metal or plastic provided with heat-conducting additives, for example plastic with ceramic particles. The adapter 20 may be configured as a housing for accommodating the PTC element 14 and the strip conductors 18. Thus, the adapter 20 may be mounted to the housing 4 together with the PTC heating assembly 14 as a structural unit.

FIG. 1 shows only an example of the positioning of such a purely heat-conducting PTC heating assembly 14. It is understood that several such PTC heating assemblies 14 with adapters 20 can be provided distributed over the rear side 12 of the housing 4.

The heating of the cover is essential. Thus, the PTC heating assembly 14 can also be provided directly in a heat-conducting manner with the cover, at least where the cover does not perform any optical tasks. Usually, however, the cover is made of a uniform transparent plastic, which justifies the location for the arrangement of the PTC heating assembly 14, as shown more concretely in FIG. 1.

Figure 2:
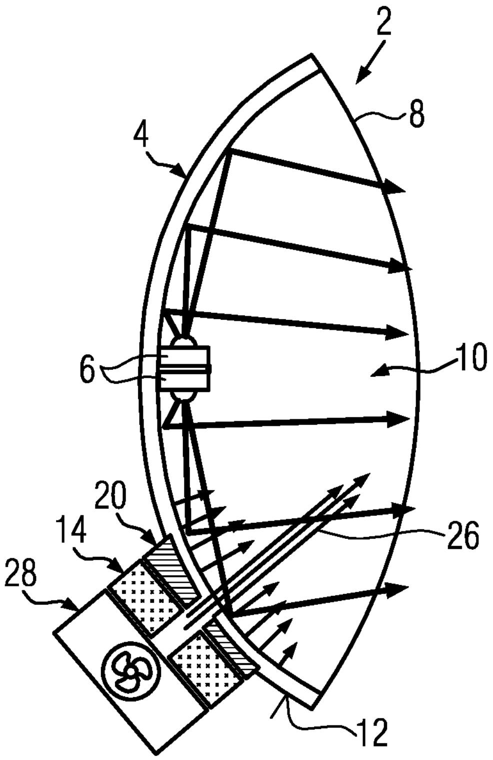
FIG. 2 shows a schematic view of a second embodiment of an optical device according to the invention, using the example of a headlight of a motor vehicle.

FIG. 2 shows an alternative solution in which the space 10 is heated both via an adapter 20 by means of heat conduction and convectively via an air flow 26 generated by a blower 28 and passed through the PTC heating assembly 14. In addition, the PTC heating assembly 14 is applied in a heat-conducting manner—as previously in the embodiment according to FIG. 1—to the outside of the cover 8.

It has been shown that icing can be quickly removed with such a solution. It is also possible to counteract clouding of headlights caused by outgassing of plastics of or in the vicinity of the headlight 2, which usually form the cover 8. The heating in particular of the space 10 prevents fogging due to precipitation and also allows the headlight to be defrosted. Condensate can also be removed by heat, which is caused by outgassing plastics. In this way, less expensive plastics can be used to manufacture the optical device, for example the headlight.

The variants shown for heating the space directly by heat emitted therein or heated air introduced therein are to be preferred, although not necessarily required. Heating of the space is possible not only according to the solutions shown in FIGS. 1 and 2, but also, for example, by heating, possibly by radiating heated air against the outside of the cover 8.

Figure 3:
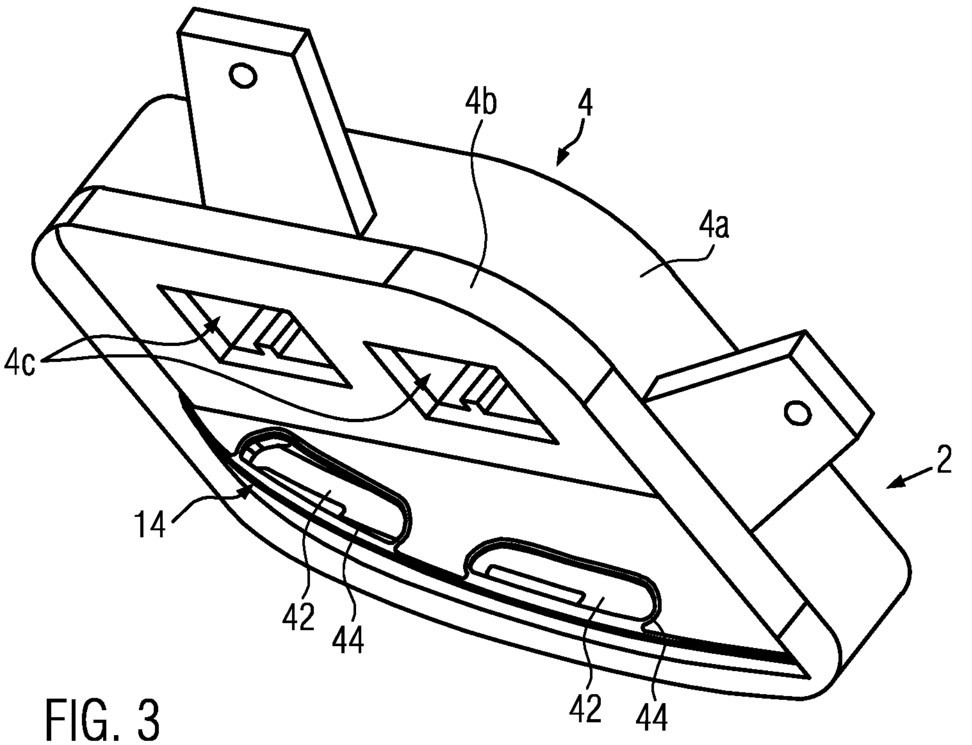
FIG. 3 shows a perspective top view of a third embodiment in the form of a headlight of a motor vehicle.

FIG. 3 et seq. show an example of the installation of two PTC heating assemblies (shown in FIG. 3 only with a component 42 associated with them) in a motor vehicle headlight 2. This headlight 2 has a multi-part housing 4*a*, 4*b* made of plastics, which are not assigned any primarily optical tasks. Rather, these housing parts 4*a*, 4*b* join two reflectors 4*c* and surround electrical leads to these reflectors 4*c*.

Reference sign 14 in FIG. 3 characterizes the PTC heating assemblies, which are explained below under reference numbers to FIGS. 4 to 6.

In these figures, reference sign 30 characterizes a heater housing with a heater housing upper part 32 and a heater housing lower part 34. The housing lower part 34, shown separately in FIG. 6, has accommodations for the PTC heating assembly 14 and the blower 18. In addition, the heater housing 30 forms an air inlet opening 36 in the area of the blower 28 and an air outlet opening 38 as well as an air channel 40 provided therebetween. The air outlet opening 38 is surrounded by an air passage surface 42, which—as can be seen in FIG. 3—is arranged in an accommodation opening 44 of the housing part 4*a* and completes the inner surface of the housing part 4*a* pointing towards the space 10. The air passage surface 42 is surrounded by a rearwardly offset contact flange 46, by means of which the heater housing upper part 32 and thus the heater housing 30 is abutted against the housing part 4*a* on the inside and positioned so that the air passage surface 42 is flush with an inner surface of the housing part 4*b*. A seal is preferably provided between the contact flange 46 and the housing 4 for tolerance compensation reasons.

Reference sign 48 characterizes contact tongues exposed on the outside of the heater housing 30 for electrical contact of the PTC heating assembly 14.

Figure 5:
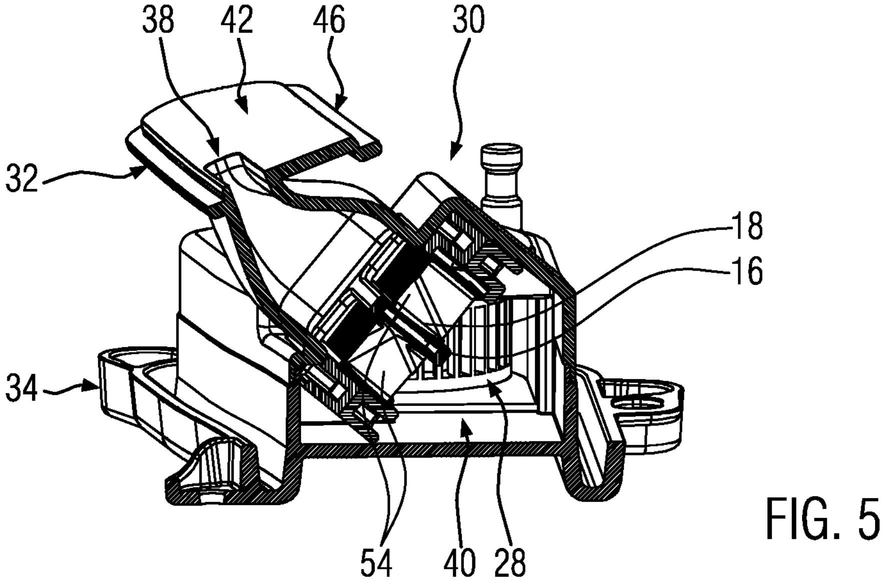
FIG. 5 shows a perspective cross-sectional view of the embodiment according to FIG. 4.
Figure 6:
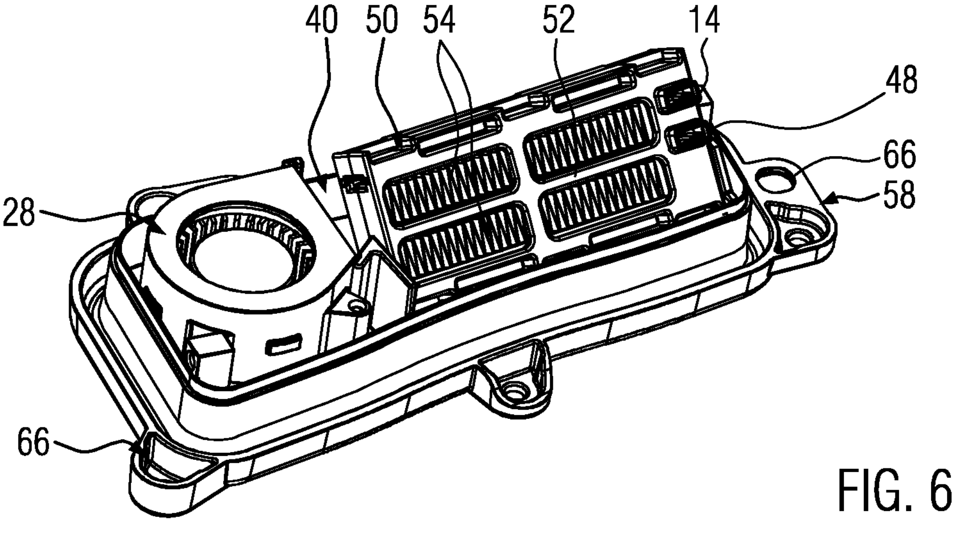
FIG. 6 shows a perspective top view of the embodiment according to FIGS. 4 and 5 with the housing upper part removed.

As FIG. 6 illustrates, the PTC heating assembly 14 has a two-part frame 50 with a longitudinal beam 52, behind which the PTC elements 16 are arranged in the longitudinal direction of the longitudinal beam 52, as well as the strip conductors 18 which accommodate the PTC elements 16 between them (compare FIG. 5). Corrugated rib elements 54, through which the air to be heated flows and which are coupled in a heat-conducting manner to the PTC elements 16, can be seen within the frame 50. For electrical contact of the contact tongues 48 by means of a plug connection, the PTC heating assembly 14 has plug elements 56 arranged on a planar frame surface, via which the PTC elements 16 are electrically connected.

The heater housing lower part 34 shown in FIG. 6 is configured as a mounting frame 58 with fastening eyes for fastening the heater housing 30 to the outer housing part of the housing 4 characterized by reference sign 4*b*. Thus, the heater housing 30 is accommodated between the outer housing part 4*a* and the inner housing part 4*b* of the housing 4 visible behind the cover 8.

As shown, the PTC heating assembly 14 is preferably provided in a heater housing 30, which is provided with a blower 28 for convective heating of the motor vehicle headlight. The heater housing 30 is realized in a structural unit with the motor vehicle headlight 2, in particular accommodated between the outer housing part 4*a* and the housing part 4*b* on the visible side. It is understood that the outer housing part 4*a* may have openings suitable for the entry of air. Air outlet openings may also be provided between the housing 4 and the cover.

Figure 4:
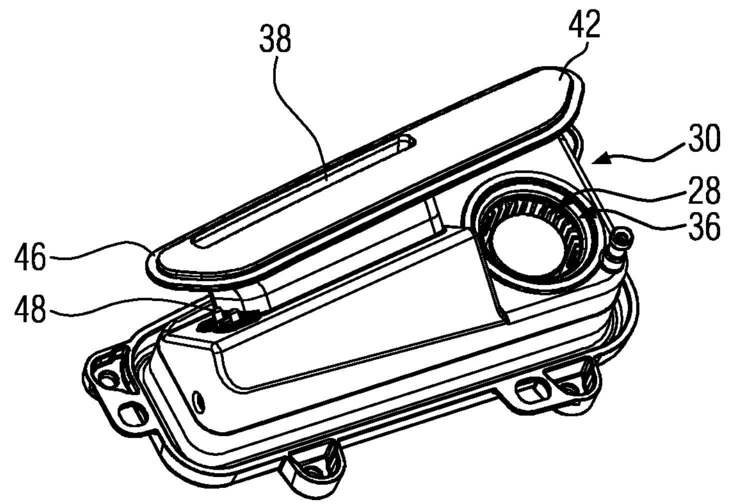
FIG. 4 shows a perspective top view of a PTC heating assembly installed in the embodiment according to FIG. 3.
Figure 7:
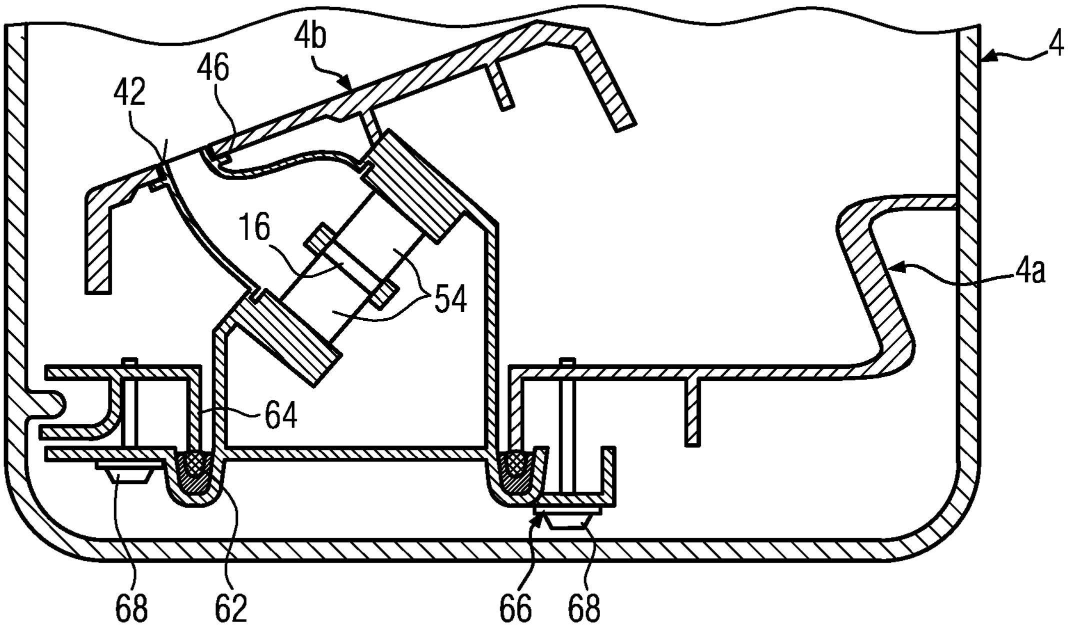
FIG. 7 shows a perspective cross-sectional view of the headlight of a motor vehicle according to FIG. 3.

The assembly of the embodiment according to FIGS. 4 to 6 on the headlight housing 4 according to FIG. 3 can be seen in particular in FIG. 7. It is evident that the mounting frame 58 forms a groove 60 which is open towards the housing 4, in particular the housing part 4*a*, and in which a seal 62 is inserted. The housing part 4*a* forms a contact rim 64 which engages in the groove 60. The mounting frame 58 is screwed to the headlight housing 4 via screws 68 passing through attachment lugs 66 of the mounting frame 58. This presses the seal into the groove 60 in a sealing manner.

Obviously, the mounting frame 58 provides the advantage of sealing the heater housing 30 with respect to the housing 4 of the motor vehicle headlight 2. Instead of such a circumferential frame, connecting elements such as snap-on connecting elements or screw-on lugs may also be provided on the circumference of the heater housing 30 for fastening the heater housing 30 to the housing 4.

The invention claimed is:

1. An optical device, comprising:

an optical system including a lens and/or a light source;

a device housing that surrounds the optical system;

a transparent cover which covers the optical system and which is connected to the device housing;

a heater housing; and a PTC heating assembly that is provided in the heater housing, the PTC heating assembly being configured to heat a space between the device housing and the cover, the PTC heating assembly including at least one PTC element and strip conductors that are connected to the PTC element in an electrically conductive manner; and a mounting frame surrounding the heater housing and forming a circumferential groove in which a seal is provided and in which a contact rim of the device housing is accommodated in a sealed manner;

wherein the PTC heating assembly is connected to the device housing of the cover with the interposition of a heat-conducting adapter, the heat-conducting adapter having, on a heating assembly side thereof, a heat coupling surface configured for the flat abutment against the PTC heating assembly and a heat decoupling surface configured for the flat abutment against the device housing and/or the cover.

2. The optical device according to claim 1, wherein the PTC heating assembly is connected to the device housing on a side of the device housing facing away from the cover.

3. The optical device according to claim 1, wherein the PTC heating assembly is connected to the device housing or the cover in a heat-conducting manner.

4. The optical device according to claim 1, wherein the heat decoupling surface has a flat extension that is larger than a flat extension of the heat coupling surface.

5. The optical device according to claim 1, further comprising a blower that connected in terms of flow to the device housing with interposition of the PTC heating assembly.

6. The optical device according to claim 5, wherein a flow path is formed between the blower and the cover.

7. The optical device according to claim 5, wherein the heater housing joins the PTC heating assembly and the blower into a structural unit, and further comprising an air inlet opening leading to the blower and an air outlet opening leading to the device housing and which forms an air channel between the blower and the PTC heating assembly.

8. The optical device according to claim 1, wherein the device housing comprises a reflector of a motor vehicle headlight with which at least one light source is associated for emitting light through the cover.

9. The optical device according to claim 8, wherein the optical device is configured for use as a motor vehicle headlight.

10. A motor vehicle headlight comprising:

at least one light source;

a headlight housing which surrounds the light source and which includes a reflector;

a transparent cover which is connected to the headlight housing;

a heater housing;

a PTC heating assembly which is provided in the heater housing, the PTC heating assembly being configured to be heat a space between the headlight housing and the cover and that comprises at least one PTC element and strip conductors connected to the PTC element in an electrically conductive manner; and a mounting frame surrounding the heater housing and forming a circumferential groove in which a seal is provided and in which a contact rim of the headlight housing is accommodated in a sealed manner;

wherein the PTC heating assembly is connected to the device housing or the cover with the interposition of a heat-conducting adapter, the heat-conducting adapter having, on a heating assembly side thereof, a heat coupling surface configured for the flat abutment against the PTC heating assembly and a heat decoupling surface configured for the flat abutment against the device housing and/or the cover.

11. An optical device, comprising:

an optical system including a lens and/or a light source;

a device housing that surrounds the optical system;

a transparent cover which covers the optical system and which is connected to the device housing;

a heater housing; and a PTC heating assembly that is provided in the heater housing, the PTC heating assembly being configured to heat a space between the device housing and the cover, the PTC heating assembly including at least one PTC element and strip conductors that are connected to the PTC element in an electrically conductive manner;

a mounting frame surrounding the heater housing and forming a circumferential groove in which a seal is provided and in which a contact rim of the device housing is accommodated in a sealed manner; and a blower that connected in terms of flow to the device housing with interposition of the PTC heating assembly.

12. The optical device according to claim 11, wherein a flow path is formed between the blower and the cover.

13. The optical device according to claim 11, wherein the heater housing joins the PTC heating assembly and the blower into a structural unit, and further comprising an air inlet opening leading to the blower and an air outlet opening leading to the device housing and which forms an air channel between the blower and the PTC heating assembly.

* * * * *